United States Patent [19]
Saeki et al.

[11] 4,251,386
[45] Feb. 17, 1981

[54] METHOD FOR PREPARING MICROCAPSULES

[75] Inventors: Keiso Saeki; Hiroharu Matsukawa; Masato Satomura, all of Fujinomiya, Japan

[73] Assignee: Fuji Photo Film Co., Ltd., Minami-ashigara, Japan

[21] Appl. No.: 926,369

[22] Filed: Jul. 20, 1978

[30] Foreign Application Priority Data

Jul. 27, 1977 [JP] Japan .................................. 52/90148

[51] Int. Cl.$^3$ ............................................. B01J 13/02
[52] U.S. Cl. ........................................ 252/316; 8/552; 71/64 F; 252/174.13; 252/299; 252/388; 252/426; 252/522 A; 282/27.5; 424/32; 426/89; 428/307; 428/914
[58] Field of Search ......................... 252/316; 424/32; 71/64 F

[56] References Cited

U.S. PATENT DOCUMENTS

| | | |
|---|---|---|
| 3,707,514 | 12/1972 | Vassiliades et al. ............... 521/78 X |
| 4,001,140 | 1/1977 | Foris et al. ........................... 252/316 |

OTHER PUBLICATIONS

Encyclopedia of Polymer Science and Technology, John Wiley & Sons, Inc., vol. 2, pp. 30 and 31, (1965).

*Primary Examiner*—Richard D. Lovering
*Attorney, Agent, or Firm*—Sughrue, Rothwell, Mion, Zinn and Macpeak

[57] ABSTRACT

A method for preparing microcapsules comprising polymerizing urea and formaldehyde in the presence of an anionic polyelectrolyte and an ammonium salt of an acid and forming a wall membrane of a urea/formaldehyde resin around droplets of a hydrophobic oily liquid.

18 Claims, No Drawings

METHOD FOR PREPARING MICROCAPSULES

BACKGROUND OF THE INVENTION

1. Field of the Invention

This invention relates to an improved method of preparing hydrophobic oil droplet-containing capsules composed of a urea/formaldehyde resin wall membrane. More particularly, it relates to a method for preparing microcapsules comprising polymerizing urea and formaldehyde in the presence of an anionic polyelectrolyte and forming a wall membrane of urea/formaldehyde resin that encircles hydrophobic oily liquid droplets, wherein the method is conducted in the presence of an ammonium salt of an acid for the purpose of improving the characteristics of the wall membrane and preventing coloration of the capsule liquid slurry when the microcapsules are to be used for, e.g., a pressure sensitive copying paper and the microcapsules contain a color former.

2. Description of the Prior Art

A method for preparing microcapsules by polymerizing urea and formaldehyde in the presence of an anionic polyelectrolyte and forming a wall membrane of urea/formaldehyde resin encircling dispersed hydrophobic oily liquid droplets is disclosed in Japanese Patent Publication No. 12518/63 and Japanese Patent Application (OPI) No. 9079/76 (the term "OPI" as used herein refers to a "published unexamined Japanese patent application").

However, the wall membrane of the microcapsules prepared by this method has low thermal and strength properties whereas the permeability of the wall membrane is high. What is more, if this microcapsule is filled with an oily solution of a color forming agent for use in a pressure sensitive recording paper, the capsule solution slurry is subject to coloration, which tendency increases in intensity as the pH of the system is decreased.

Accordingly, if oil-containing microcapsules prepared using such a conventional method are employed in a pressure sensitive recording paper, the wall membranes of the microcapsules are thermally degraded with the color forming ability of the paper being reduced when it is stored at high temperatures.

Due to the low strength of the wall membranes, the microcapsules are easily ruptured with the slightest external pressure, and thus the ease of handling during processing or printing is lowered.

In addition to the above, the high permeability of the wall membranes often causes an excessive coloration of a developer sheet or microcapsule sheet when the sheets come into contact with water.

SUMMARY OF THE INVENTION

Therefore, one object of this invention is to provide a method for preparing microcapsules having high heat resistance.

Another object of this invention is to provide a method for preparing microcapsules having high strength.

A further object of this invention is to provide a method for preparing microcapsules whose wall membranes have a low permeability.

Still another object of this invention is to prepare microcapsules containing a color former compound where a coloration of the slurry containing the microcapsules does not occur.

It has now been found that these objects can be achieved by polymerizing urea and formaldehyde in the presence of an anionic polyelectrolyte and an ammonium salt of an acid to form wall membranes of a urea/formaldehyde resin encapsulating dispersed hydrophobic oily liquid droplets.

Accordingly, this invention provides a method for preparing microcapsules comprising polymerizing urea and formaldehyde in the presence of an anionic polyelectrolyte and an ammonium salt of an acid and forming a wall membrane of a urea/formaldehyde resin around droplets of a hydrophobic oily liquid.

DETAILED DESCRIPTION OF THE INVENTION

Aliphatic carboxylic acids of lower molecular weight such as formic acid, acetic acid and citric acid, inorganic acids such as hydrochloric acid and phosphoric acid, acidic salts or easily hydrolyzable salts such as aluminum sulfate, titanium oxychloride, magnesium chloride, ammonium chloride, ammonium nitrate, ammonium sulfate and ammonium phosphate are generally known as acid catalysts for preparing microcapsules using a precondensate between urea and formaldehyde (Tenside) (e.g., as disclosed in Japanese Patent Application (OPI) No. 7313/71).

Unexpectedly and surprisingly, in this invention it has now been found that, of these acid catalysts, only ammonium salts can be used to achieve the primary purpose of this invention (that is, preparing microcapsules by polymerization of a urea monomer and a formaldehyde monomer).

The method for preparing microcapsules according to this invention is described in detail below.

Basically, this method comprises the following steps:

(1) preparing an aqueous solution system containing an anionic polyelectrolyte and urea;

(2) emulsifying a hydrophobic oily liquid which serves as a substantially insoluble nucleus material in the aqueous solution system;

(3) adding an ammonium salt of an acid to the aqueous solution system;

(4) adding formaldehyde to the aqueous solution system; and (5) polymerizing the urea and formaldehyde while stirring the aqueous solution system.

The procedure described above is typical, and the only requirement for the addition of the ammonium salt of the acid is that it be present during the time when the urea is polymerized with the formaldehyde, and therefore, the ammonium salt of the acid may be added in step (1) or step (4) or step (5).

The urea may be added in step (3), step (4) or step (5).

Suitable anionic polyelectrolytes which can be used are natural or synthetic anionic polyelectrolytes containing, for example, a $—COO^-$ group, a $—SO_3^-$ group or the like. Specific examples of suitable anionic polyelectrolytes which can be used are copolymers of maleic anhydride (including the hydrolysis products thereof), polymers and copolymers of acrylic acid or methacrylic acid, and polymers and copolymers of vinyl benzene sulfonic acid.

Examples of suitable copolymers of maleic anhydride (including the hydrolysis products, thereof) are styrene-maleic anhydride copolymers, methyl vinyl ether-maleic anhydride copolymers, ethylene-maleic anhydride copolymers, vinyl acetate-maleic anhydride copolymers, methacrylamide-maleic anhydride copolymers, isobutylene-maleic anhydride copolymers, etc. These copolymers preferably have a molecular weight of about 5,000 to about 2,000,000, and preferably contain about 10 to about 60 mol% of maleic anhydride.

Examples of suitable copolymers of acrylic acid and methacrylic acid are methyl acrylate-acrylic acid copolymers, ethyl acrylate-acrylic acid copolymers, methyl acrylate-methacrylic acid copolymers, methyl methacrylate-acrylic acid copolymers, methyl methacrylate-methacrylic acid copolymers, butyl acrylate-acrylic acid copolymers, butyl methacrylate-acrylic acid copolymers, octyl acrylate-acrylic acid copolymers, methyl acrylate-acrylamide-acrylic acid copolymers, butyl acrylate-acrylamide-methacrylic acid copolymers, acrylonitrile-acrylic acid copolymers, acrylonitrile-methacrylic acid copolymers, styrene-acrylic acid copolymers, styrene-methacrylic acid copolymers, vinyl toluene-acrylic acid copolymers, hydroxyethyl acrylate-acrylic acid copolymers, hydroxyethyl methacrylate-methacrylic acid copolymers, vinyl acetate-acrylic acid copolymers, vinyl acetate-methacrylic acid copolymers, acrylamide-acrylic acid copolymers, acrylamide-methacrylic acid copolymers, acrylamide-methylol acrylamide-acrylic acid copolymers, acrylamide-methylol acrylamide-methacrylic acid copolymers, methacrylamide-acrylic acid copolymers, methacrylamide-methacrylic acid copolymers, methacrylamide-methylol acrylamide-acrylic acid copolymers, methacrylamide-methylol acrylamide-methacrylic acid copolymers, N-methyl acrylamide-methacrylic acid copolymers, N-ethyl acrylamide-acrylic acid copolymers, N,N-dimethyl acrylamide-acrylic acid copolymers, N,N-dimethyl acrylamide-methacrylic acid copolymers, N,N-diethyl acrylamide-acrylic acid copolymers, butyl acrylamide-acrylic acid copolymers, dimethyl itaconate-acrylic acid copolymers, dihexyl itaconate-acrylic acid copolymers, acrylonitrile-acrylamide-acrylic acid copolymers, acrylamide-acrylic acid-methacrylic acid copolymers, acrylamide-styrene-acrylic acid copolymers, acrylamide-dimethyl itaconate-acrylic acid copolymers, etc. The alkali metal salts (e.g., the sodium or potassium salts) of these copolymers may also be used.

The above described copolymers of acrylic acid and methacrylic acid preferably have a molecular weight of about 20,000 to about 1,000,000 and preferably contain about 5 to 100 mol% of acrylic acid or methacrylic acid (or the salts thereof).

Examples of suitable copolymers of vinyl benzene sulfonic acid (or the salts thereof) are methyl acrylate-vinyl benzene sulfonic acid copolymers, vinyl acetate-vinyl benzene sulfonic acid copolymers, acrylamide-vinyl benzene sulfonic acid copolymers, acryloyl morpholine-vinyl benzene sulfonic acid copolymers, vinyl pyrrolidone-vinyl benzene sulfonic acid copolymers, etc.

These polymers or copolymers of vinyl benzene sulfonic acid preferably have a molecular weight of about 5,000 to about 2,000,000, more preferably from 10,000 to 1,000,000, and most preferably from 20,000 to 500,000, and preferably contain about 5 to 100 mol% of vinyl benzene sulfonic acid (or the salts thereof).

Examples of materials serving as nuclei for each microcapsule are mineral oils, animal oils, vegetable oils and synthetic oils. Examples of mineral oils are petroleum and petroleum fractions such as kerosene, gasoline, naphtha and paraffin oil. Examples of animal oils are fish oil, lard, etc. Examples of vegetable oils are peanut oil, linseed oil, soybean oil, castor oil, corn oil, etc. Examples of synthetic oils are biphenyl compounds (such as isopropyl biphenyl and isoamyl biphenyl), terphenyl compounds (e.g., as disclosed in German Patent Application (OLS) No. 2,153,635), phosphoric acid esters (such as triphenyl phosphate), naphthalene compounds (e.g., as disclosed in German Patent Application (OLS) No. 2,141,194, methane compounds (e.g., as disclosed in German Patent Application (OLS) No. 2,153,634), phthalic acid esters (such as diethyl phthalate, dibutyl phthalate, dioctyl phthalate), salicylic acid esters (such as ethyl salicylate), etc.

If desired, these natural mineral oils, animal oils, vegetable oils and synthetic oils may be appropriately mixed with agrichemicals, medicines, perfumes, synthetic chemicals, adhesives, liquid crystals, foods, detergents, dyes, catalysts, corrosion inhibitors, etc., for ultimate incorporation into microcapsules.

Suitable ammonium salts of an acid which can be used in this invention are the reaction product of an inorganic acid or an organic acid with ammonia and preferably of an inorganic or organic acid having a pKa of about 5 or less, more preferably 2 or less, and most preferably −1 or less. The same effect is obtained whether the reaction product is added to the aqueous solution system or whether the reaction product is prepared in situ.

Suitable examples of inorganic acids and organic acids which can be used are described below.

(1) Inorganic Acids (having a pKa ≦ 5)

For example, hydrogen selenide, hydrogen fluoride, hydrogen telluride, nitrous acid, etc.

(2) Organic Acids (having a pKa ≦ 5)

For example, formic acid, acetic acid, propionic acid, acrylic acid, benzoic acid, naphthoic acid, oxalic acid, malonic acid, succinic acid, glutaric acid, adipic acid, oxalacetic acid, fumaric acid, tartaric acid, phthalic acid, citric acid, etc.

(3) Inorganic Acids (having a pKa ≦ 2)

For example, chlorous acid, phosphoric acid, arsenic acid, phosphorous acid, sulfurous acid, periodic acid, hypophosphorous acid, pyrophosphoric acid, iodic acid, etc.

(4) Organic Acids (having a pKa ≦ 2)

For example, trifluoroacetic acid, trichloroacetic acid, benzene sulfonic acid, naphthalene sulfonic acid, p-toluene sulfonic acid, maleic acid, etc.

(5) Inorganic Acids (having a pKa ≦ −1)

For example, chloric acid, chromic acid, nitric acid, permanganic acid, selenic acid, sulfuric acid, hydrochloric acid, perchloric acid, hydrobromic acid, hydroiodic acid, etc.

Particularly preferred examples of ammonium salts of acids are ammonium chloride, ammonium sulfate, ammonium nitrate, and ammonium dihydrogen phosphate.

The ammonium salts of the acid is preferably used in this invention in an amount of about 1% by weight or more, more preferably 5% by weight or more, and most preferably 10% by weight or more, based on the weight of the urea.

To polymerize the urea and formaldehyde, the pH of the aqueous solution system must be controlled at a value of about 7.0 or less, preferably 5.0 or less, more preferably 4.5 or less, and most preferably 4.0 or less.

The temperature of the aqueous solution system must be controlled at about 10° to 95° C., preferably 25° to 85° C., more preferably 35° to 75° C., and most preferably 45° to 60° C.

A preferred molar ratio of the formaldehyde to the urea is about 0.6:1 to 5:1, more preferably 1:1 to 4:1, and most preferably from 1.4:1 to 3.0:1.

A polyhydric phenol may be added to the reaction system of the urea and formaldehyde. Examples of suitable polyhydric phenols are resorcinol, catechol, pyrogallol, phloroglucin, gallic acid, hydroquinone, orcinol, tannic acid, etc. These polyhydric phenols may be used in the system in an amount of about 5% by weight or more, e.g., up to about 30% by weight, based on the amount of the urea.

The term "urea/formaldehyde resin" is used herein in a broad sense and includes amino resins. Amino resins generally include those resins prepared by reacting aldehydes with amines having at least two amino groups per molecule. Examples of such amines (those suitable for use in combination with urea) are guanidine, N-methyl urea, thiourea, and melamine. In this invention, the term "urea/formaldehyde resin" generally means an amino resin.

As described hereinbefore, this invention provides a method which is very advantageous for preparing microcapsules. That is, by using an ammonium salt of an acid in forming the wall membrane of the urea/formaldehyde resin encapsulating hydrophobic oily liquid droplets in the presence of an anionic polyelectrolyte, microcapsules having high heat resistance high strength and low permeability and also free from microcapsule slurry coloration can be obtained when the microcapsules contain a color former compound.

The microcapsules prepared by the method of this invention are particularly advantageous for use in a pressure sensitive copying paper. The microcapsules used for this purpose preferably have a size of about 1 to 20μ, more preferably 1.5 to 10μ, and most preferably 2 to 8μ.

Techniques for the preparation of microcapsules are described in detail in U.S. Pat. No. 4,001,140, Japanese Patent Publication No. 12518/73 and Japanese Patent Application (OPI) No. 9079/76. Such techniques can be used in preparing the microcapsules of this invention using the urea and formaldehyde as described herein as a microcapsule wall forming material.

U.S. Pat. No. 4,001,140 Foris et al specifically discloses anionic polyelectrolytes useful in the present invention, in Foris et al these anionic polyelectrolytes being called a system modifier material.

The amount of system modifier in the encapsulating system appears to be important in practice of this invention with respect to the minimum amount to assure adequate interference with the urea/formaldehyde reaction and with respect to the maximum amount as an economic matter. Of course, if the system modifier is present in very high concentrations, the system viscosity will be inoperably high. As a general rule, the encapsulating system should include at least 0.75 percent by weight system modifier based on the aqueous system weight. At the other extreme, it must be remembered that the variety of eligible materials precludes establishment of an exact general maximum due to differences in solution viscosity among the several materials. It can be said that more than 10 percent by weight based on the aqueous system weight is seldom used or required.

This invention is described in greater detail below by reference to the following examples. It is to be understood that these examples are given for illustrative purposes only and are not to be construed as limiting this invention. Unless otherwise indicated herein, all parts, percents, ratios and the like are by weight.

EXAMPLE 1

A copolymer of vinyl acetate and maleic anhydride (containing 45 mol% of maleic anhydride, and having an average molecular weight of 250,000) was dissolved in boiling water to prepare a 10% aqueous solution of the copolymer. To 25 parts of this aqueous solution was added 2.5 parts of urea and 0.25 parts of resorcinol under stirring. Thereafter, using a 20% aqueous solution of sodium hydroxide, the pH of the solution system was adjusted to 3.7.

An oil-in-water type emulsion was prepared by adding 25 parts of diisopropyl naphthalene having 2.5% crystal violet lactone and 1.0% benzoyl leuco-methylene blue dissolved therein to the aqueous solution above under vigorous stirring. The stirring was stopped when the average size of the oil droplets reached 5μ.

To the emulsion thus prepared was added 50 parts of a 1.0% aqueous solution of ammonium chloride. With stirring, 6.4 parts of a 37% aqueous solution of formaldehyde was added, followed by adjusting the system temperature to 60° C. The temperature of 60° C. was maintained for 1 hour while stirring was continued. Subsequently, the temperature was reduced to 25° C. to obtain microcapsules containing the color formers dissolved in the oil.

The microcapsules prepared in this Example can be advantageously used as microcapsules for a pressure sensitive copying paper.

EXAMPLE 2

The procedures of Example 1 were repeated except that the 1.0% aqueous solution of ammonium chloride was replaced by a 1.0% aqueous solution of ammonium sulfate.

EXAMPLE 3

The procedures of Example 1 were repeated except that the 1.0% aqueous solution of ammonium chloride was replaced by a 1.0% aqueous solution of ammonium nitrate.

EXAMPLE 4

The procedures of Example 1 were repeated except that the 1.0% aqueous solution of ammonium chloride was replaced by a 1.0% aqueous solution of ammonium acetate.

COMPARATIVE EXAMPLE 1

The procedures of Example 1 were repeated except that the 50 parts of the 1.0% aqueous solution of ammonium chloride was replaced by 50 parts of water.

COMPARATIVE EXAMPLE 2

The procedures of Example 1 were repeated except that the 1.0% aqueous solution of ammonium chloride was replaced by a 1.0% aqueous solution of aluminum sulfate.

COMPARATIVE EXAMPLE 3

The procedures of Example 1 were repeated except that the 1.0% aqueous solution of ammonium chloride was replaced by a 1.0% aqueous solution of magnesium chloride.

To 50 parts of each microcapsule slurry prepared in Examples 1 to 4 and Comparative Examples 1 to 3 above were added 15 parts of a 10% aqueous solution of polyvinyl alcohol (PVA-205, manufactured by Kuraray Co., Ltd.), 3 parts of wheat starch, and 50 parts of water so as to adjust the pH to 10. Using a coating rod, the preparation was coated on a stencil paper of a basis weight of 50 g/m² until the solids content coated was 4.2 g/m², and the coating was dried. A sheet coated with each of the microcapsules (hereinafter, referred to as Sheet (A) was obtained.

A sheet coated with a color developer (hereinafter, referred to as Sheet (C) which is to be combined with Sheet A for evaluating the heat resistance, strength (pressure resistance and abrasion resistance) and permeability (water immersion color development) of the wall membrane was prepared as follows.

A mixture of 60 parts of kaolin and 2 parts of sodium alkyl benzene sulfonate was dispersed or dissolved in 300 parts of water. Using a 10% aqueous solution of sodium hydroxide, the pH of the solution or dispersion was adjusted to 10. With careful stirring, 70 parts of a 10% aqueous solution of zinc chloride was added to the dispersion or solution, and under continued stirring, a solution with 0.1 g equivalent of 3,5-di-tert-butyl salicylic acid in 200 parts of a 2% aqueous solution of sodium hydroxide was poured into the reaction system. The dispersion obtained was mixed with 50 parts of a latex of a styrene-butadiene copolymer (having a solids content of 40%) to obtain a coating solution. Using a coating rod, the coating solution thus obtained was coated on a stencil paper of a basis weight of 50 g/m² until the solids content coated was 3.0 g/m², and the coating was dried.

The following methods were used to evaluate the characteristics of the microcapsules.

(1) Heat Resistance

Sheet A was stored in an oven at 100° C. for 10 hours, then superposed on Sheet C (with the coated surfaces facing each other) and a pressure of 600 kg/cm² was applied to the assembly of Sheet A and Sheet C. The heat resistance value was determined as follows.

Heat Resistance Value = $(CD_{AH}/CD_{AO})(100)$ wherein $CD_{AH}$ is the color density obtained with Sheet A heated at 100° C. for 10 hours and $CD_{AO}$ is the color density obtained with Sheet A not heated.

(2) Pressure Resistance

Sheet A and Sheet C were superposed (with the coated surfaces facing each other) and a pressure of 40 kg/cm² was applied to the assembly. The color density of the color mark on Sheet C was then determined.

(3) Abrasion Resistance

Sheet A and Sheet C were superposed (with the coated surfaces facing each other) and the assembly was moved under a load of 200 g/cm², at a rotational speed of 30 rpm and a linear speed of 1 m/min. The color density of the color mark on Sheet C was then determined.

(4) Water Immersion Color Development

Sheet A and Sheet C were superposed (with the coated surfaces facing each other) and immersed in water for 5 seconds and the assembly was air-dried therefter. The color density of the color mark on Sheet A was then determined.

The color density measured in each of the evaluations described above was measured using a reflection type spectrophotometer (at a wavelength of 610 mμ).

The characteristics of the microcapsules prepared in each of Examples 1 to 4 and Comparative Examples 1 to 3 above and the degree of blue coloration of each microcapsule slurry obtained are shown in the following table.

TABLE

| Example No. | Degree of Blue Coloration of Microcapsule Slurry | Heat Resistance Value[1] | Pressure Resistance[2] | Abrasion Resistance[3] | Water Immersion Color Development[4] |
|---|---|---|---|---|---|
| Ex. 1 | Substantially no coloration | 99 | D = 0.10 | D = 0.04 | D = 0.10 |
| Ex. 2 | Substantially no coloration | 100 | 0.11 | 0.05 | 0.12 |
| Ex. 3 | Substantially no coloration | 95 | 0.11 | 0.04 | 0.11 |
| Ex. 4 | No coloration | 82 | 0.13 | 0.06 | 0.21 |
| Comp. Ex. 1 | Considerable coloration | 25 | 0.16 | 0.12 | 0.57 |
| Comp. Ex. 2 | Extreme coloration | 36 | 0.15 | 0.11 | 0.61 |
| Comp. Ex. 3 | Considerable coloration | 31 | 0.17 | 0.11 | 0.55 |

[1] 50 or less - Entirely impractical, 51 to 80 - Questionable practicality, 81 to 90 - Substantially no problem in practical application, 91 to 100 - No problem at all in practical application
[2] - [4] A lower color density (D) is preferred.

This results in the table above show an obvious improvement in the microcapsules prepared in Examples 1 to 4 over those prepared in Comparative Examples 1 to 3 in the degree of blue coloration of the microcapsule slurry, heat resistance, strength and permeability of the wall membrane.

EXAMPLE 5

A copolymer of ethylene and maleic anhydride (containing 50 mol% of maleic anhydride and having an average molecular weight of 120,000) was dissolved in boiling water to prepare a 10% aqueous solution thereof. To 25 parts of the aqueous solution thus prepared was added 0.2 part of ammonium dihydrogen phosphate with stirring. Thereafter, the pH of the aqueous solution system was adjusted to 4.0 using a 20% aqueous solution of sodium hydroxide.

An emulsion of the oil-in-water type having an average oil droplet size of 7μ was prepared by adding 30 parts of monoisopropyl biphenyl having 2.5% crystal violet lactone dissolved therein to the aqueous solution prepared above with vigorous stirring. The emulsion thus prepared was then dispersed in 50 parts of a 5.0% aqueous solution of urea with stirring. Under continued stirring, 6.0 parts of a 37% aqueous solution of formaldehyde was added to the system, followed by adjusting the temperature to 55° C. After the temperature had been maintained at 55° C. for 2 hours under stirring, the temperature was decreased to 25° C. so as to obtain microcapsules each containing a color former. No blue coloration of the slightest degree occurred in the microcapsule slurry. The microcapsules were subjected to heat resistance testing, and a satisfactory heat resistance value of 91 was obtained.

COMPARATIVE EXAMPLE 4

The procedures of Example 5 were repeated except that the 0.2 part of ammonium dihydrogen phosphate was not used.

Blue coloration occurred in the microcapsule slurry. Heat resistance testing gave a heat resistance value which was as low as 58, suggesting that the practical applicability of the microcapsules was questionable.

EXAMPLE 6

Potassium polyvinyl benzene sulfonate (having an average molecular weight of 70,000) was dissolved in boiling water to prepare a 10% aqueous solution thereof.

To 50 parts of the aqueous solution was added a mixture of 2.5 parts of urea and 0.25 parts of resorcinol with stirring. Thereafter, the pH of the aqueous solution system was adjusted to 3.5 using a 1 N aqueous solution of hydrochloric acid.

An emulsion of the oil-in-water type having an average oil droplet size of 4μ was prepared by adding 25 parts of phenyl cyclohexane having 2.5% crystal violet lactone dissolved therein to the aqueous solution with vigorous stirring. To this emulsion was added 30 parts of water, and 8.0 parts of a 37% aqueous solution of formaldehyde was further added with stirring. Then the temperature of the system was adjusted to 55° C. After addition of 20 parts of a 3.0% aqueous solution of ammonium chloride, the temperature of 55° C. was maintained for 2 hours with continued stirring. The temperature was then decreased to 25° C. to obtain microcapsules containing a color former dissolved in an oil. The microcapsule slurry was substantially free from blue coloration.

The microcapsules were subjected to heat resistance testing, and a satisfactory heat resistance value of 99 was obtained.

COMPARATIVE EXAMPLE 5

The procedures of Example 6 were repeated except that the 20 parts of the 3.0% aqueous solution of ammonium chloride was replaced by 20 parts of water.

A blue coloration occurred in the microcapsule slurry. Heat resistance testing gave a heat resistance value of 49 which was so low that the microcapsules were not suitable for practical application.

While the invention has been described in detail and with reference to specific embodiments thereof, it will be apparent to one skilled in the art that various changes and modifications can be made therein without departing from the spirit and scope thereof.

We claim:

1. In a method for preparing microcapsules comprising polymerizing urea and formaldehyde in water in the presence of 0.75 to 10% by weight of an anionic polyelectrolyte and forming a wall membrane of a urea/formaldehyde resin around droplets of a hydrophobic oily liquid, the improvement which comprises the presence of about 1% by weight or more, based on the weight of the urea, of an ammonium salt of an acid, whereby microcapsules having high heat resistance, high strength, low permeability and which are also free from microcapsule slurry coloration are obtained.

2. The method of claim 1, wherein said anionic polyelectrolyte is a natural or synthetic anionic polyelectrolyte containing a —COO$^-$ group or a —SO$_3^-$ group.

3. The method of claim 2, wherein said anionic polyelectrolyte is a copolymer of maleic anhydride, a polymer or copolymer of acrylic acid or methacrylic acid or a polymer or copolymer of vinyl benzene sulfonic acid.

4. The method of claim 3, wherein said acid is chloric acid, chromic acid, nitric acid, permanganic acid, selenic acid, sulfuric acid, hydrochloric acid, perchloric acid, hydrobromic acid or hydroiodic acid.

5. The method of claim 3, wherein said acid is trifluoroacetic acid, trichloroacetic acid, benzene sulfonic acid, naphthalene sulfonic acid, p-toluene sulfonic acid or maleic acid.

6. The method of claim 3, wherein said maleic anhydride copolymer contains about 10 to about 60 mol% of maleic anhydride and has a molecular weight of about 5,000 to about 2,000,000; said polymer or copolymer of acrylic acid or methacrylic acid contains about 5 to about 100 mol% of acrylic acid or methacrylic acid, or the salt thereof, and has a molecular weight of about 20,000 to about 1,000,000; and said polymer or copolymer of vinyl benzene sulfonic acid contains about 5 to 100 mol% of vinyl benzene sulfonic acid or the salt thereof and has a molecular weight of about 5,000 to 2,000,000.

7. The method of claim 6, wherein said acid is chloric acid, chromic acid, nitric acid, permanganic acid, selenic acid, sulfuric acid, hydrochloric acid, perchloric acid, hydrobromic acid or hydroiodic acid.

8. The method of claim 6, wherein said acid is trifluoroacetic acid, trichloroacetic acid, benzene sulfonic acid, naphthalene sulfonic acid, p-toluene sulfonic acid or maleic acid.

9. The method of claim 1, wherein said hydrophobic oily liquid is a natural mineral oil, an animal oil, a vegetable oil or a snythetic oil.

10. The method of claim 1, wherein said hydrophobic oily liquid has dissolved therein at least one of an agrichemical, a medicine, a perfume, an adhesive, a liquid crystal, a food, a detergent, a dye, a catalyst, a fine chemical or a corrosion inhibitor.

11. The method of claim 1, wherein said ammonium salt of an acid is an ammonium salt of an inorganic acid.

12. The method of claim 11, wherein said inorganic acid is chloric acid, chromic acid, nitric acid, permanganic acid, selenic acid, sulfuric acid, hydrochloric acid, perchloric acid, hydrobromic acid or hydroiodic acid.

13. The method of claim 1, wherein the polymerizing is at a pH of about 7.0 or less.

14. The method of claim 1, wherein the polymerizing is at a temperature of about 10° to about 95° C.

15. The method of claim 1, wherein the molar ratio of the formaldehyde to the urea is about 0.6:1 to about 5:1.

16. The method of claim 1, wherein said ammonium salt of an acid is an ammonium salt of an organic acid.

17. The method of claim 16, wherein said organic acid is trifluoroacetic acid, trichloroacetic acid, benzene sulfonic acid, naphthalene sulfonic acid, p-toluene sulfonic acid or maleic acid.

18. The method of claim 1, wherein said hydrophobic oily liquid is a color former compound.

* * * * *